June 24, 1924.

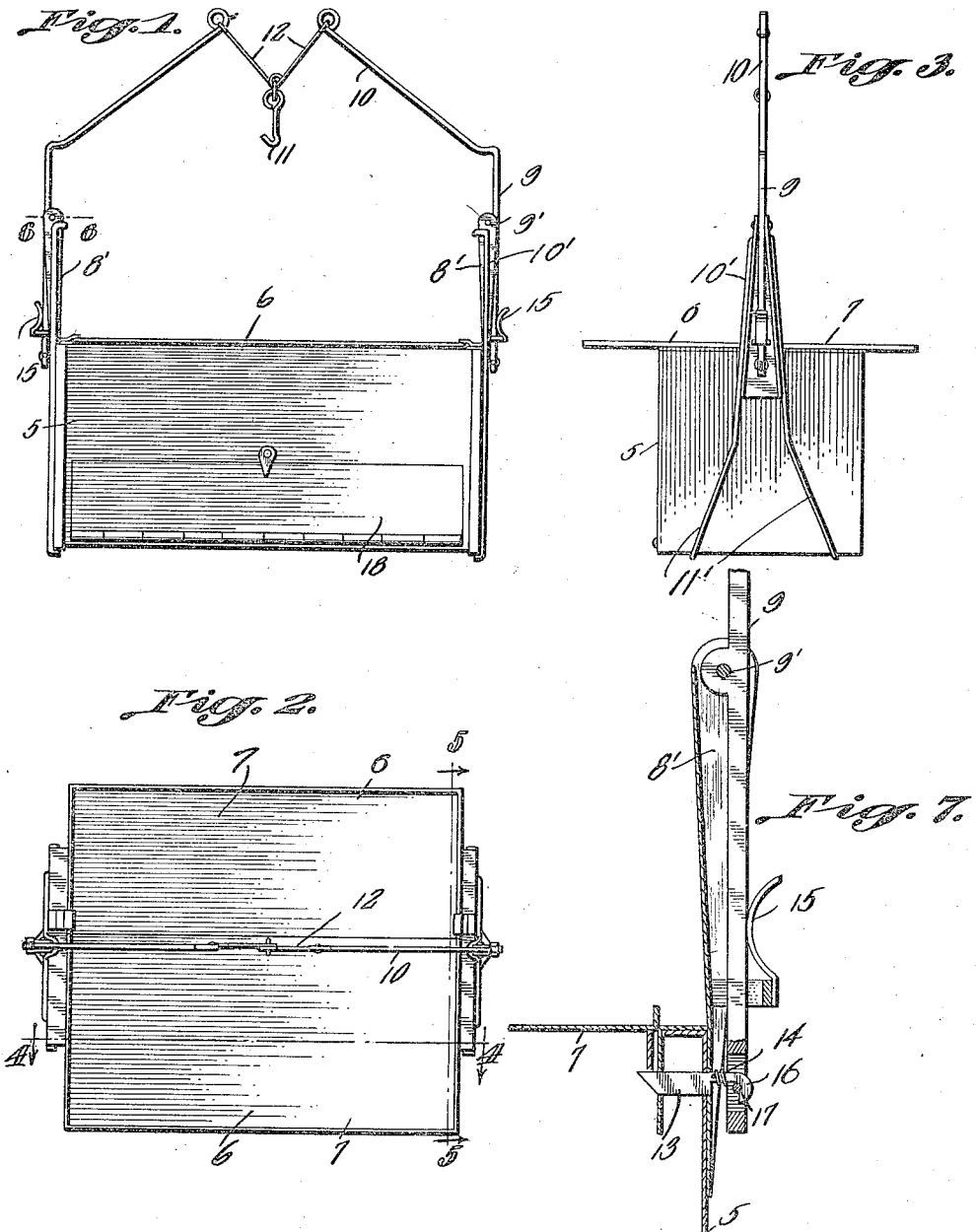

W. O. McCORMACK

TRAP

Filed Jan. 31, 1923

Inventor
W. O. M? Cormack

By C. A. Snow & Co.
Attorneys

Patented June 24, 1924.

1,498,664

UNITED STATES PATENT OFFICE.

WILLIAM O. McCORMACK, OF FLORENCE, ALABAMA, ASSIGNOR OF ONE-HALF TO WILLIAM R. McKERALL, OF FLORENCE, ALABAMA.

TRAP.

Application filed January 31, 1923. Serial No. 616,061.

*To all whom it may concern:*

Be it known that I, WILLIAM O. MC-CORMACK, a citizen of the United States, residing at Florence, in the county of Lauderdale and State of Alabama, have invented a new and useful Trap, of which the following is a specification.

This invention relates to traps and more particularly to a trap especially designed for use in treating cattle for vermin eradication.

The primary object of the invention is to provide a tank for containing the fluid, trap doors being provided for covering the tank so that the animals may walk onto the trap doors which may be sprung to drop the animal within the tank.

Another object of the invention is to provide a trap which will be actuated by the weight of the animal moving on the trap, thereby eliminating the use of springs or the like for actuating the trap.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a side elevational view of a trap constructed in accordance with the invention.

Figure 2 is a plan view thereof.

Figure 3 is an end elevational view of the trap.

Figure 6 is a sectional view taken on line 6—6 of Figure 1.

Figure 7 is a sectional detail view disclosing the latch mechanism.

Figure 4:
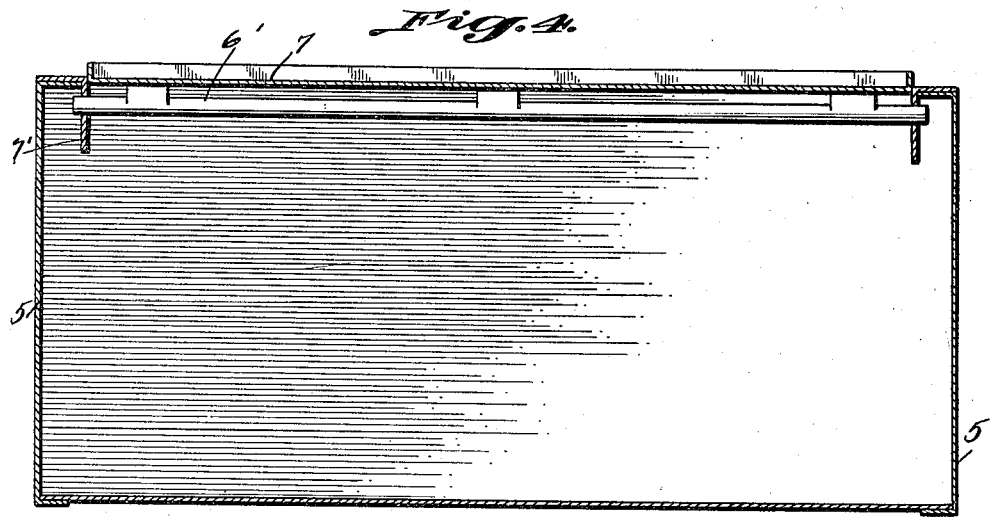
Figure 4 is a sectional view taken on line 4—4 of Figure 2.
Figure 5:
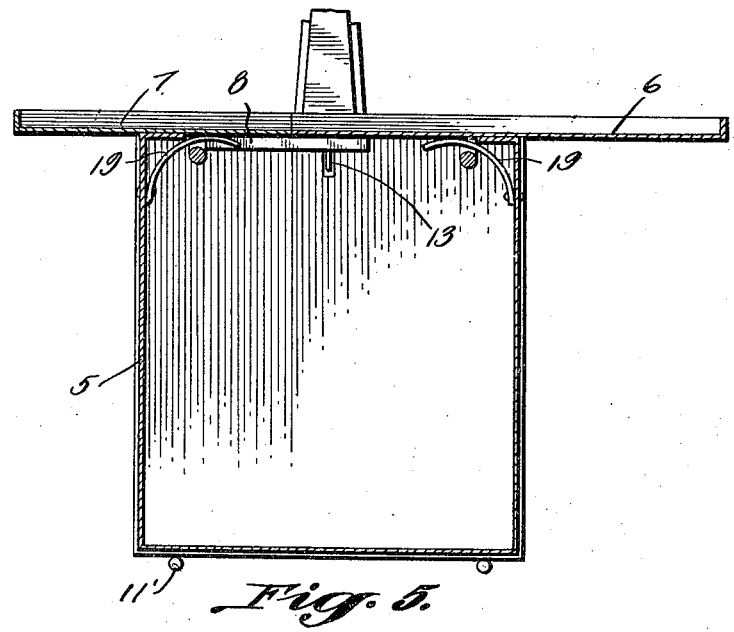
Figure 5 is a sectional view taken on line 5—5 of Figure 2.

Referring to the drawings in detail, the trap includes a box-like body portion indicated generally by the reference character 5, the same being constructed preferably of metal, the connected ends and edges of the sections forming the body portion being water-proofed so that the body portion will hold water.

Supported at the upper portion of the body 5 are the closures 6 and 7 which are secured to the supporting rods 6' that have their ends mounted within openings in the downwardly extended flanges 7' forming a part of the body portion, the closures being so mounted that the outer edges thereof will overbalance the inner edges to cause the closures to normally lie in closed position. Extension arms 8 are carried by one of the closures and underlie the adjacent closure 7 to move the closure 7 to its closed position when the closure 6 moves to its closed position.

Disposed intermediate the side edges of the body are the upwardly extending supports 8' between which the actuating arms 9 are pivotally mounted as at 9', the upper ends of the arms 9 extending inwardly as at 10 where they have connection with the bait hook 11 by means of the links 12. Disposed adjacent to the supports 8' are rods 10' each of which includes a pair of leg members 11' having their lower ends extended inwardly and engaging the bottom of the body portion. The upper portions of these rods are bent to embrace portions of the supports 8' to brace the supports against inward movement.

Controlled by the arms 9 are the sliding latch members 13 which have their inner ends so disposed as to engage the extension arms 8 to restrict movement of the closures 6 and 7 of unequal widths. Spring members 14 operate to equalize the pressure exerted on the arms 9 by the spring members 15 to insure the true operation of the actuating arms.

As shown, each of the latch members 13 is formed with a curved extremity 16 adapted to be positioned over the connecting pin 17 associated therewith, whereby movement of the arms 9 produces a relative movement of the latch members 13 to disengage the closures 6 and 7 and permit the weight of an animal's body to operate the closures 6 and 7, moving them to open positions.

A hinged closure indicated at 18 forms a part of one wall of the body and provides access to the interior of the body to permit the animal caught by the trap to be removed.

In the operation of the device, the body portion is filled with a quantity of water, and bait is positioned on the bait hook 11. It is obvous that when an animal endeavors to remove the bait, the actuating arms 9 will move inwardly, at their upper ends causing the lower ends to move outwardly, operating the latch members 13 to release the closures 6 and 7, allowing the weight of the animal's body to cause the closures to pivot inwardly, dropping the animal in the body portion 5.

Spring members 19 are secured to each of the closures and tend to quickly return the closures 6 and 7 to their normal or closed positions and prevent the animal from escaping.

Stops 20 are secured to the upper edges of the body and are designed to contact with the closures 6 and 7 and prevent the closures from pivoting or moving in the opposite directions beyond the horizontal position.

What is claimed as new is:—

In a trap, a body portion, hinged closures mounted on the body portion, sliding latch members extending under the hinged closures and adapted to normally hold the closures in closed positions, vertical arms pivotally supported at the ends of the body portion, said arms having openings formed adjacent to the ends thereof, pins disposed in the openings said latch members having hooks adapted to engage the pins to connect the latch members and arms to cause a movement of the latch member when the arms are operated, a spring on each latch member, spring members supported adjacent to the arms and engaging the arms to normally urge the arms towards the body portion, and said arms adapted to operate the latch members to release the closures.

In testimony that I claim the foregoing as my own, I have hereto affixed my signature in the presence of two witnesses.

WILLIAM O. McCORMACK.

Witnesses:
S. B. HOWARD,
R. N. MARTIN.